(12) United States Patent
Alexandroni et al.

(10) Patent No.: US 10,930,064 B2
(45) Date of Patent: Feb. 23, 2021

(54) IMAGING RECONSTRUCTION SYSTEM AND METHOD

(71) Applicant: COVIDIEN LP, Mansfield, MA (US)

(72) Inventors: Guy Alexandroni, Ramat Hasharon (IL); Ron Barak, Tel Aviv (IL); Ariel Birenbaum, Herzliya (IL); Nicolas J. Merlet, Ramot Bet (IL)

(73) Assignee: COVIDIEN LP, Mansfield, MA (US)

( * ) Notice: Subject to any disclaimer, the term of this patent is extended or adjusted under 35 U.S.C. 154(b) by 83 days.

(21) Appl. No.: 16/259,612

(22) Filed: Jan. 28, 2019

(65) Prior Publication Data

US 2019/0244420 A1 Aug. 8, 2019

Related U.S. Application Data

(60) Provisional application No. 62/628,028, filed on Feb. 8, 2018.

(51) Int. Cl.

| | |
|---|---|
| *G06T 11/00* | (2006.01) |
| *G06T 17/10* | (2006.01) |
| *G06T 15/08* | (2011.01) |
| *G06K 9/00* | (2006.01) |
| *G06T 5/00* | (2006.01) |

(Continued)

(52) U.S. Cl.
CPC .......... *G06T 17/10* (2013.01); *G06K 9/00208* (2013.01); *G06T 5/002* (2013.01); *G06T 5/005* (2013.01); *G06T 5/20* (2013.01); *G06T 7/0012* (2013.01); *G06T 11/005* (2013.01); *G06T 11/006* (2013.01); *G06T 11/008* (2013.01);

(Continued)

(58) Field of Classification Search
CPC ........................... G06T 17/10; G06K 9/00208
See application file for complete search history.

(56) References Cited

U.S. PATENT DOCUMENTS

| | | |
|---|---|---|
| 6,118,845 A | 9/2000 | Simon et al. |
| 6,470,207 B1 | 10/2002 | Simon et al. |

(Continued)

FOREIGN PATENT DOCUMENTS

WO  2004017263 A2  2/2004

OTHER PUBLICATIONS

Hua Li, et al., "Evaluation of dual-front active contour segmentation and metal shadow tilling methods on metal artifact reduction in multi-slice helical CT", Proceedings Medical Imaging 2010: Physics of Medical Imaging, vol. 7622, pp. 1-7 (2010).

(Continued)

*Primary Examiner* — Tuan H Nguyen
(74) *Attorney, Agent, or Firm* — Weber Rosselli & Cannon LLP

(57) ABSTRACT

The disclosure is directed to a method for generating a three dimensional (3D) volume including a treatment target including receiving a plurality of two dimensional (2D) input images of a patient, determining a metal artifact in each of the plurality of 2D input images, removing the metal artifacts from the plurality of 2D input images based on the determination of the metal artifact, and replacing metal artifacts with alternative pixel data to generate a plurality of filtered 2D images. A 3D volume is generated from the plurality of filtered 2D images. The plurality of 2D input images including a treatment target.

18 Claims, 12 Drawing Sheets

(51) Int. Cl.
*G06T 5/20* (2006.01)
*G06T 7/00* (2017.01)

(52) U.S. Cl.
CPC .... *G06T 15/08* (2013.01); *G06T 2207/10121* (2013.01); *G06T 2211/421* (2013.01)

(56) References Cited

U.S. PATENT DOCUMENTS

| | | |
|---|---|---|
| 6,483,892 B1 | 11/2002 | Wang et al. |
| 8,549,607 B2 | 4/2003 | Webber |
| 6,801,594 B1 | 10/2004 | Ali et al. |
| 6,845,142 B2 | 1/2005 | Ohishi |
| 6,990,368 B2 | 1/2006 | Simon et al. |
| 7,369,695 B2 | 5/2008 | Zettel et al. |
| 8,750,582 B2 | 6/2014 | Boese et al. |
| 2010/0183214 A1 | 7/2010 | McCollough et al. |
| 2015/0029178 A1* | 1/2015 | Claus .................... G06T 11/005 345/419 |
| 2016/0242854 A1* | 8/2016 | Grass ...................... G06T 5/002 |

OTHER PUBLICATIONS

Extended European Search Report issued in corresponding Appl. No. EP 19156052.3 dated Jun. 11, 2019 (12 pages).

European Search Report for Application No. 05254709, dated Aug. 12, 2005.

My-Ha Le, et al., "3D scene reconstruction enhancement method based on automatic context analysis and convex optimization", Neurocomputing vol. 137, pp. 71-78 (2014).

Zhiwei Tang, et al., "Efficient Metal Artifact Reduction Method Based on Improved Total Variation Regularization", Journal of Medical and Biological Engineering, vol. 34, No. 3, pp. 261-268 (2014).

* cited by examiner

IMAGING RECONSTRUCTION SYSTEM AND METHOD

CROSS-REFERENCE TO RELATED APPLICATIONS

This application claims the benefit of the filing date of provisional U.S. Patent Application No. 62/628,028, filed Feb. 8, 2018, the entire contents of which are incorporated herein by reference.

BACKGROUND

There are several commonly applied methods for treating various maladies affecting tissues and organs including the liver, brain, heart, lung and kidney. Often, one or more imaging modalities, such as magnetic resonance imaging, ultrasound imaging, computed tomography (CT), as well as others are employed by clinicians to identify areas of interest within a patient and ultimately targets for treatment.

An endoscopic approach has proven useful in navigating to areas of interest within a patient, and particularly so for areas within luminal networks of the body such as the lungs. To enable the endoscopic, and more particularly the bronchoscopic, approach in the lungs, endobronchial navigation systems have been developed that use previously acquired MRI data or CT image data to generate a three dimensional rendering or volume of the particular body part such as the lungs. In particular, previously acquired images, acquired from an MRI scan or CT scan of the patient, are utilized to generate a three dimensional or volumetric rendering of the patient.

The resulting volume generated from the MRI scan or CT scan is then utilized to create a navigation plan to facilitate the advancement of a navigation catheter (or other suitable device) through a bronchoscope and a branch of the bronchus of a patient to an area of interest. Electromagnetic tracking may be utilized in conjunction with the CT data to facilitate guidance of the navigation catheter through the branch of the bronchus to the area of interest. In certain instances, the navigation catheter may be positioned within one of the airways of the branched luminal networks adjacent to, or within, the area of interest to provide access for one or more medical instruments.

Thus, in order to generate a navigation plan, or in order to even generate a three dimensional (3D) volume or volumetric rendering of the patient's anatomy, such as the lung, a clinician is required to utilize an MRI system or CT system to acquire the necessary image data for construction of the 3D volume. An MRI system or CT-based imaging system is extremely costly, and in many cases not available in the same location as the location where a navigation plan is generated or where a navigation procedure is carried out.

A fluoroscopic imaging device is commonly located in the operating room during navigation procedures. The standard fluoroscopic imaging device may be used by a clinician to visualize and confirm the placement of a tool after it has been navigated to a desired location. However, although standard fluoroscopic images display highly dense objects such as metal tools and bones as well as large soft-tissue objects such as the heart, the fluoroscopic images have difficulty resolving small soft-tissue objects of interest such as lesions. Further, the fluoroscope image is only a two dimensional projection. In order to be able to see small soft-tissue objects in 3D dimensional space, an X-ray volumetric reconstruction is needed.

X-ray volumetric reconstruction may be achieved by back projecting fluoroscopic images from multiple angles. However, while performing a surgical procedure, often metal treatment and monitoring devices, such as bronchoscopes, catheters, electrocardiograph (ECG) components, patient sensor triplets (PSTs), and metal spheres on angle measurement jig may be used. These metal treatment and monitoring devices will therefore generally be present in the captured fluoroscopic images.

Metal devices produce strong artifacts in images and thus severely reduce image quality. These artifacts are usually due to noise, beam hardening, scattering, and partial volume, and their magnitude is often several hundred Hounsfield units (HUs). Metal artifacts in fluoroscopic or CT images appear as streaks and broad bright or dark bands, severely degrading image quality and drastically reducing the diagnostic value of images. Additionally, the metal objects may obstruct a clinician's view of a treatment target.

Algorithms developed to reduce metal artifacts can be classified into projection-interpolation-based methods, iterative reconstruction methods, or their combination. Projection interpolation methods treat parts of the projections affected by metal (the so-called metal shadow) as unreliable. These metal shadow data are complemented by interpolation between neighboring reliable data. Iterative reconstruction methods model the main causes for metal artifacts, such as noise and beam hardening. Although the image quality obtained from these methods is often better than that of projection-interpolation-based methods, the main drawback is their extremely high computational complexity. In particular, iterative methods have trouble dealing with data for a metal so dense that it stops almost all beams passing through it.

Some algorithms combining projection completion and iterative reconstruction have been proposed. These methods create a model image using classification prior information and then forward-project the model image to fill the gaps of the metal shadow. The model image classifies the pixels into several kinds of tissue and diminishes the density contrast of soft tissues. The region close to the metal is often not well corrected and some residual shadow artifacts still remain.

In recent years many algorithms have been developed for 3D reconstruction and motion estimation, which can roughly be divided into several categories. Namely: methods using bundle adjustment (BA) or methods based on factorization and hierarchical methods. In the first group, multi-view structure from motion started from estimating the geometry of two views. This structure will be used to estimate the pose of the adjacent camera. The quality of the reconstruction strongly depends on the initial structure of first camera pairs. Another disadvantage of this method is the drift problem. It also has expensive computation cost and suffers from accumulated errors when the number of image is increased. In the second group, the missing data and sensitiveness to outliers is the significant drawback. It is well studied by some authors. In the third group, the input images must be arranged in the hierarchical tree processed from root to the top.

SUMMARY

Provided in accordance with the disclosure is a method for generating a three dimensional (3D) volume including a treatment target. The method includes receiving a plurality of two dimensional (2D) input images of a patient, recognizing a metal artifact in each of the plurality of 2D input images, removing the metal artifacts from the plurality of 2D input images based on the recognizing of the metal artifact, and replacing the metal artifact with alternative pixel data to generate a plurality of filtered 2D images, and generating the 3D volume from the plurality of filtered 2D images. The plurality of 2D input images including a treatment target.

In another aspect of the disclosure, the plurality of 2D input images is received from a fluoroscopic imager.

In yet another aspect of the disclosure, the method further includes imaging the patient to generate the plurality of 2D input images.

In another aspect of the disclosure, known metal artifacts include one or more of a bronchoscope, a biopsy tool, an ablation device, a probe, an endoscope, a catheter, a stapler, an implant, or components of an angle measurement jig.

In another aspect of the disclosure, the method further includes generating a plurality of 2D masks that correspond to the plurality of 2D input images. Removing the metal artifacts from the plurality of 2D input images may include applying the plurality of 2D masks to the corresponding plurality of 2D input images.

In yet another aspect of the disclosure, the method further includes performing in-painting to generate the alternative image data.

In a further aspect of the disclosure, the method further includes computing a plurality of inverse masks corresponding to the plurality of masks, generating a plurality of filtered 2D input images by multiplying each of the plurality of 2D input images by the corresponding inverse mask using a Gaussian filter, generating a plurality of filtered masks by filtering each of the plurality of inverse masks using a Gaussian filter, generating a plurality of blurred images by dividing each of the plurality of filtered 2D input images by a corresponding filtered mask of the plurality of filtered masks, and generating the alternative image data based on the plurality of inverse masks, the plurality of blurred frames, and the plurality of input images. The plurality of inverse masks may have a same size as the plurality of masks and values equal to an inverse of values of each of the plurality of masks. If a pixel in a filtered mask is equal to 0, a zero is assigned to a corresponding pixel location in a corresponding blurred frame of the plurality of blurred images.

In yet another aspect of the disclosure, the 3D volume is generated by back projecting filtered 2D images.

In another aspect of the disclosure, a system for generating a three dimensional (3D) volume including a treatment target is provided. The system includes a processor and a memory storing an application, which, when executed by the processor, causes the processor to recognize a metal artifact in a plurality of two dimensional (2D) input images, the 2D input images being of a patient including a target, replace pixels in the plurality of 2D input images corresponding to the recognized metal artifact with alternative pixel data to generate a plurality of filtered 2D images, and generate the 3D volume based on the plurality of filtered 2D images.

In another aspect, the alternative pixel data is generated by performing in-painting. In an aspect, the in-painting includes computing a plurality of inverse masks corresponding to the plurality of masks, the plurality of inverse masks having a same size as the plurality of masks and values equal to an inverse of values of each of the plurality of masks, generating a plurality of filtered 2D input images by multiplying each of the plurality of 2D input images by the corresponding inverse mask using a Gaussian filter, generating a plurality of filtered masks by filtering each of the plurality of inverse masks using a Gaussian filter, generating a plurality of blurred images by dividing each of the plurality of filtered 2D input images by a corresponding filtered mask of the plurality of filtered masks, where if a pixel in a filtered mask is equal to 0, a zero is assigned to a corresponding pixel location in a corresponding blurred frame of the plurality of blurred images, and generating the alternative pixel data based on the plurality of inverse masks, the plurality of blurred frames, and the plurality of input images.

In yet another aspect, the processor is further caused to generate a plurality of 2D masks that correspond to the plurality of 2D input images. The processor may be further configured to remove the metal artifact from the plurality of 2D input images by applying the plurality of 2D masks to the corresponding plurality of 2D input images. The 3D volume may be generated by back projecting the filtered 2D images.

In yet another aspect, a method for generating a three dimensional (3D) volume including a treatment target is provided. The method includes recognizing a metal artifact in a plurality of two dimensional (2D) input images, the 2D input images being of a patient including a target, performing in-painting to generate alternative pixel data, replacing pixels in the plurality of 2D input images corresponding to the recognized metal artifact with alternative pixel data to generate a plurality of filtered 2D images, generating the 3D volume based on the plurality of filtered 2D images, and displaying the generated 3D volume on a display.

In an aspect, the method further includes generating a plurality of 2D masks that correspond to the plurality of 2D input images.

In another aspect, removing the metal artifact from the plurality of 2D input images includes applying the plurality of 2D masks to the corresponding plurality of 2D input images.

In an aspect, performing in-painting may include computing a plurality of inverse masks corresponding to the plurality of masks, the plurality of inverse masks having a same size as the plurality of masks and values equal to an inverse of values of each of the plurality of masks, generating a plurality of filtered 2D input images by multiplying each of the plurality of 2D input images by the corresponding inverse mask using a Gaussian filter, generating a plurality of filtered masks by filtering each of the plurality of inverse masks using a Gaussian filter, generating a plurality of blurred images by dividing each of the plurality of filtered 2D input images by a corresponding filtered mask of the plurality of filtered masks, wherein if a pixel in a filtered mask is equal to 0, a zero is assigned to a corresponding pixel location in a corresponding blurred frame of the plurality of blurred images, and generating the alternative pixel data based on the plurality of inverse masks, the plurality of blurred frames, and the plurality of input images.

In an aspect, generating the 3D volume based on the plurality of filtered 2D images includes back projecting filtered 2D images. The plurality of 2D images may be received from a fluoroscopic imager.

Further, to the extent consistent, any of the aspects described herein may be used in conjunction with any or all of the other aspects described herein.

BRIEF DESCRIPTION OF THE FIGURES

Objects and features of the presently disclosed system and method will become apparent to those of ordinary skill in the art when descriptions of various embodiments thereof are read with reference to the accompanying drawings, of which.

DETAILED DESCRIPTION

The disclosure is directed to a method for generating a 3D volume from a series of 2D images by removing metal artifacts from the original 2D images and back projecting the modified 2D images.

Specifically, the disclosure relates to generating 3D images of tissue treatment targets within a patient that may aide a clinician in performing medical treatment on the tissue treatment target. Example medical treatments that may be performed using the 3D image for guidance include biopsy, ablation, and lavage treatment. During these procedures, a treatment device, often metallic in nature, is guided through a luminal network or inserted percutaneously into the patient. The treatment device is then moved to a position approximate the treatment target. Once the treatment device is approximate the treatment target, a 3D volume may be developed to either update a previous model of the patient to establish a more precise or more recent location of the treatment target or, alternatively, to develop a 3D volume for the first time that may be displayed to aid a clinician in guiding a medical treatment device to a treatment target. The 3D volume must be highly accurate in order to ensure the device is placed at the treatment target so that the treatment target receives the treatment required and no other tissue is damaged. The present method for generating a 3D image of a target removes interferences from metal artifacts, such as those from a metal medical treatment device, and creates clear, accurate 3D images.

Figure 1:
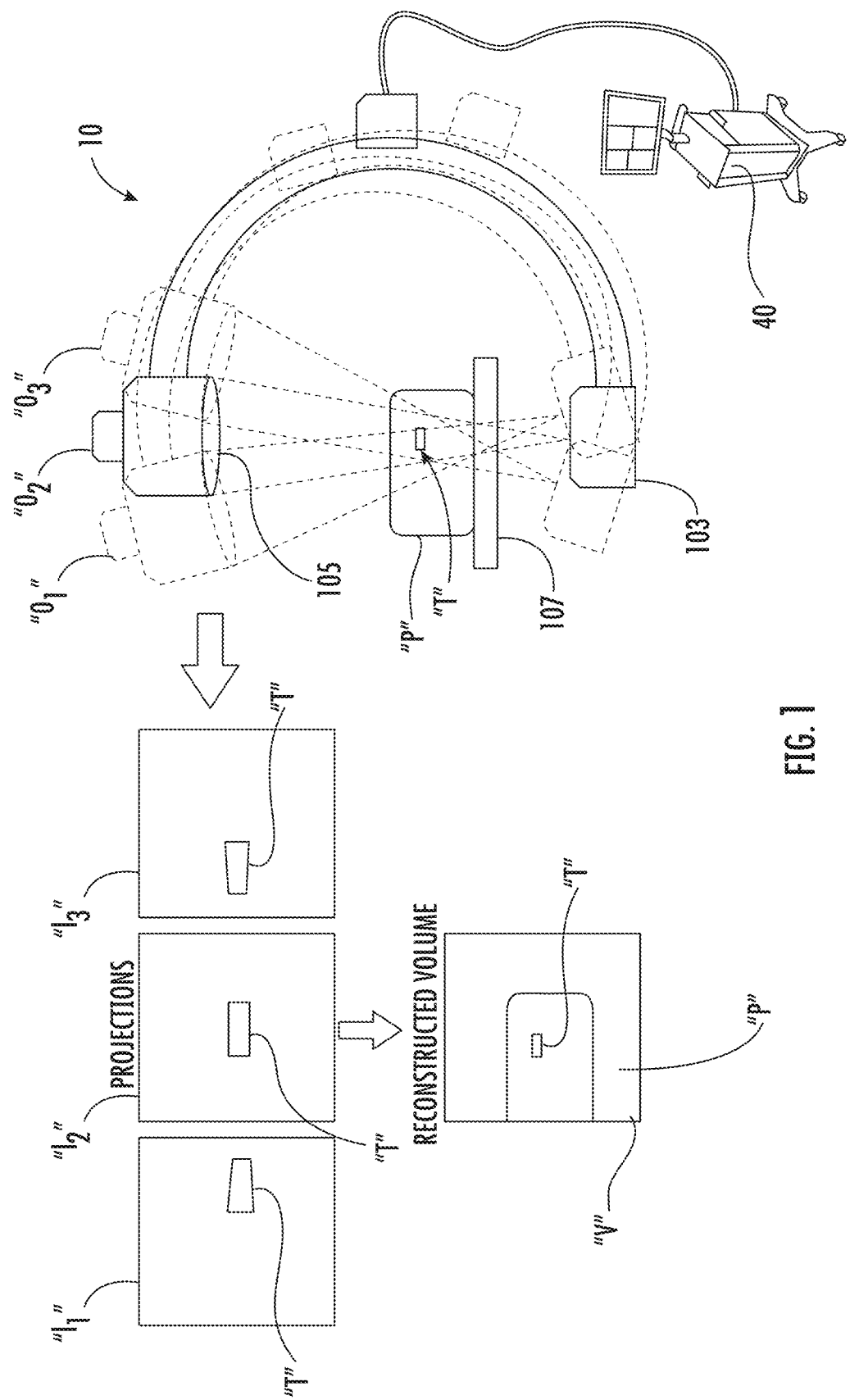
FIG. 1 depicts a diagram showing a process for generating a 3D volume of a patient in accordance with the disclosure.

FIG. 1 illustrates a diagram of the steps for 3D images or a 3D volume of a patient in accordance with the disclosure. FIG. 1 shows fluoroscopic C-arm 10 which includes x-ray emitter 103 and x-ray receiver 105. Fluoroscopic C-arm 10 is connected to and is in communication with workstation 40. Workstation 40 includes one or more memories or processors and is configured to perform the process described in FIG. 3. Fluoroscopic C-arm 10 is configured to revolve around patient P positioned on table 107. Fluoroscopic C-arm 10 images patient P at various orientations $O_1$, $O_2$, $O_3$ as it is moved around patient P. A clinician may manually move C-arm 10 about patient P, or workstation 40 may control a motor (not shown) to move C-arm 10 to various orientations, e.g. orientations $O_1$, $O_2$, $O_3$. Orientations $O_1$, $O_2$, $O_3$ may be determined by determining distances and orientations of metal jig spheres S (See FIG. 2). Orientations $O_1$, $O_2$, $O_3$ are shown at approximately −15°, 0°, and +15° degrees from vertical as an illustrative example of possible orientations at which patient P may be imaged. However, any other orientation along the arc of C-arm 10 are contemplated herein as well. FIG. 1 further shows Target T. Target T is a treatment location intended to be imaged and for identification and location purposes for treatment.

As fluoroscopic C-arm 10 revolves around patient P, x-ray emitter 103 emits x-rays toward patient P and x-ray receiver 105. Some of the x-rays collide with and are absorbed or deflected by patient P at various depths. The remaining x-rays, those that are not absorbed or deflected by patient P pass through patient P and are received by x-ray receiver 105. X-ray receiver 105 generates pixel data according to a quantity of x-rays received at certain locations along x-ray receiver 105 and transmits the pixel data to workstation 40 in order to generate projection images $I_1$, $I_2$, $I_3$. Images $I_1$, $I_2$, $I_3$ as shown in FIG. 1 correspond to orientations $O_1$, $O_2$, $O_3$.

Each image $I_1$, $I_2$, $I_3$ includes a view of target T at an orientation given by orientations $O_1$, $O_2$, $O_3$. When projection images $I_1$, $I_2$, $I_3$ are combined through back projection, a process described in more detail with reference to FIGS. 3 and 6 below, a 3D volume V or image can be reconstructed. The volume includes a location and a depth of target T within volume V in order to provide a 3D image to aid a clinician guiding a medical tool to target T or to update a previously generated 3D image or volume with respect to the location of target T within patient P.

Figure 2:
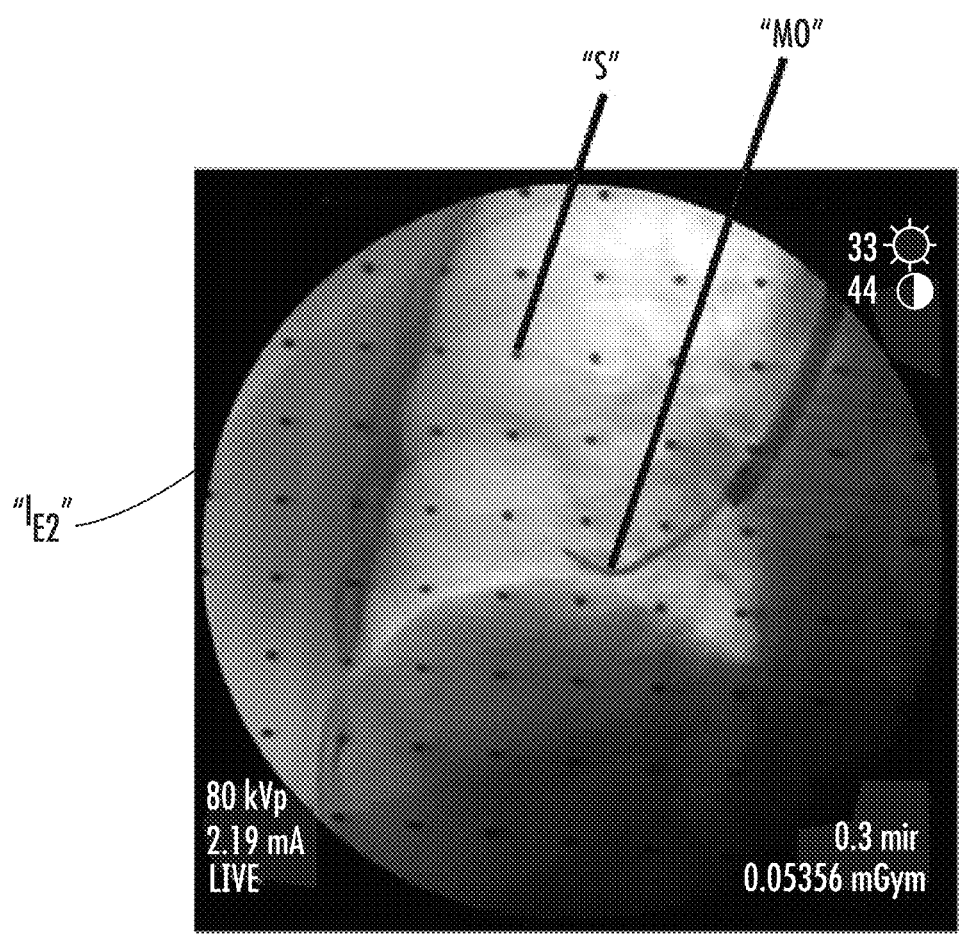
FIG. 2 depicts an example input image which may be received in the process shown in FIG. 1.

FIG. 2 illustrates example image $I_{E1}$, an illustrative example a potential image $I_1$, $I_2$, $I_3$, of a patient P generated by fluoroscopic C-arm 10. Image $I_{E1}$ includes metal object $MO_{E1}$. Metal object MO may interfere with the generation of a 3D volume created through back projection. Image $I_{E1}$ further includes metal jig spheres S that, when imaged, can be used to determine an orientation $O_1$, $O_2$, $O_3$ from which example image $I_{E1}$ is imaged. The orientation $O_1$, $O_2$, $O_3$ is determined according to a distance between metal jig spheres S which is dependent upon the orientation $O_1$, $O_2$, $O_3$ of fluoroscopic C-arm 10.

Figure 3:
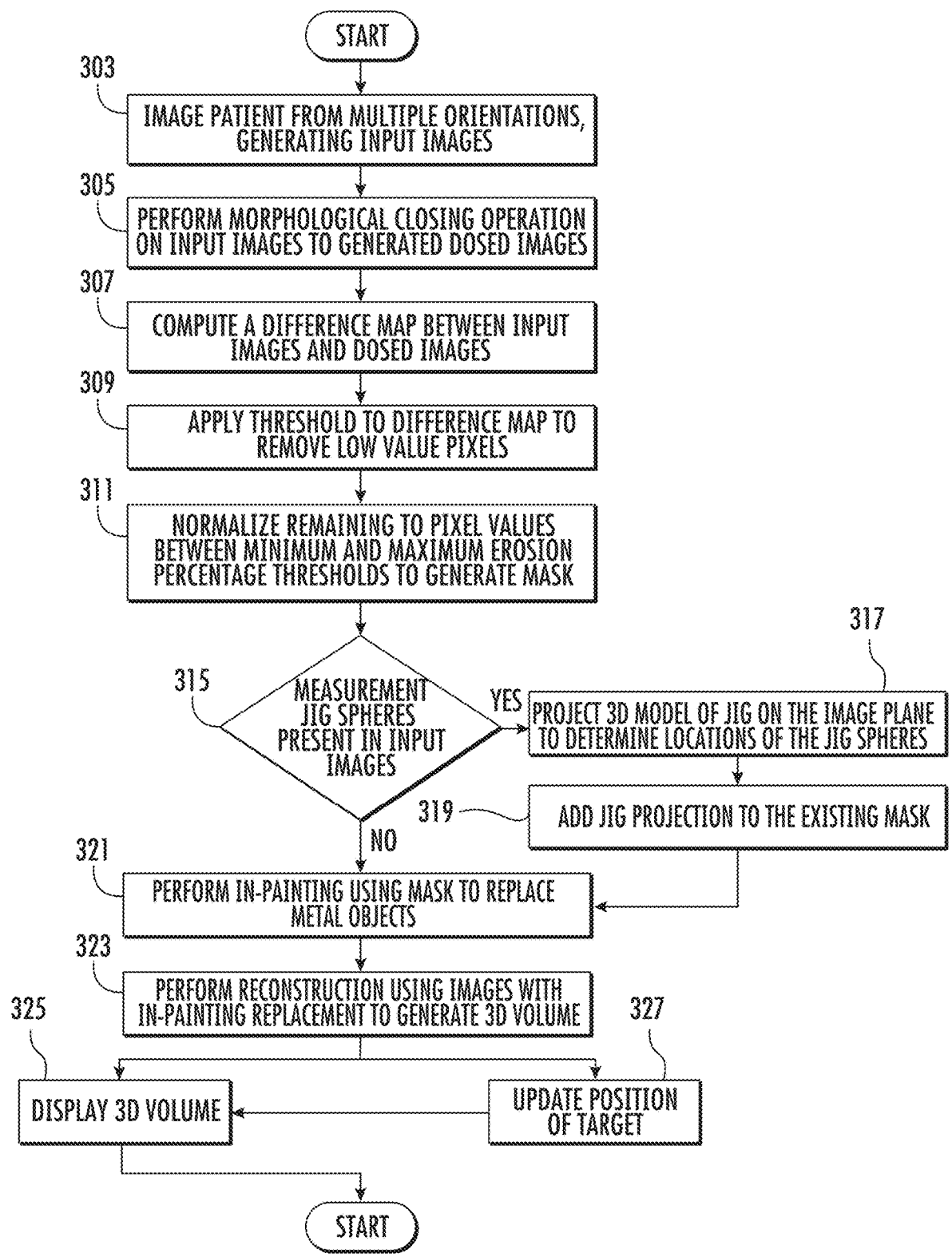
FIG. 3 depicts a flowchart describing a process for removing metal artifacts and generating an improved 3D image in accordance with the disclosure.

FIG. 3 illustrates a flowchart describing an embodiment for removing metal artifacts to generate an improved 3D image. At step 303, a clinician or a motor (not shown) causes fluoroscopic C-arm 10 to move from a starting position to each of orientations $O_1$, $O_2$, $O_3$. At each orientation an image is taken by projecting x-rays from x-ray emitter 103 to x-ray receiver x-ray receiver 105. The received x-rays are used to generate pixels data for images $I_1$, $I_2$, $I_3$ according to a density of x-rays received at various locations on x-ray emitter 103. An example image $I_E$ of possible input images $I_1$, $I_2$, $I_3$ including metal object MO is shown in FIG. 2.

At step 305, workstation 40 performs a morphological closing operation using structure element on the input images $I_1$, $I_2$, $I_3$ (e.g. input image $I_{E1}$) generated at step 303. The morphological closing operation includes, first, dilating the pixels with an intensity value above a threshold of input image $I_{E1}$ using the structural element. The structure element is a 2D array, which is smaller in size than input images $I_1$, $I_2$, $I_3$, describing a design. The structural element may be chosen by a clinician or user or workstation 40 may use an existing structure element. In dilating the pixels with an intensity value above a threshold, an array of pixels surrounding each high intensity pixel and equal to the size of the structural element is made to resemble the design of the structural element. That is, the value of each high intensity pixel is expanded to nearby pixels according to the design of the structural element. As a result, boundaries of high intensity pixel areas are expanded to such that nearby high intensity pixel areas may connect to form a larger, joined area of high intensity pixels. Next, as the second aspect of a morphological closing operation, erosion is performed using the same or a different structural element. Erosion causes pixels at boundaries of groupings of high intensity pixels to be removed, reducing the size of the areas of high intensity pixels.

The morphological closing operation is designed to accentuate thin and metal objects O such as a catheter and metal spheres S such that they may be more easily identified. As a result of the morphological closing operation, a closed frame image is developed.

Turning now to step 307, workstation 40 develops a difference map between each input image $I_{E1}$ and the corresponding closed image developed for each input image at step 305. The difference map may be generated through a variety of algorithms. On a most basic level, the pixel values of the closed image may be subtracted from the pixel values of input image $I_{E1}$. Alternatively, the difference map may be given by subtracting a closed image by the corresponding 2D input image, dividing the difference of the subtraction but the 2D input image, and multiplying the quotient of the division by 100%. Additional algorithms known in the art may also be used to generate a difference map.

At step 309, a threshold is applied to the difference map developed at step 307. Workstation 40 removes all pixels with a pixel intensity value below a threshold value. Once the pixels are removed, only those pixels representing a portion of a metal object MO should remain.

Next, at step 311, workstation 40 generates masks to be applied to the input images by normalizing the remaining pixels in the difference map, those representing metal objects, to pixel values between minimum and maximum erosion percentage. Normalizing pixel values changes the range of pixel intensity values and creates a more detailed grayscale image. Normalizing the remaining pixels also emphasizes the shape and boundaries of the groupings of pixels. The minimum and maximum erosion percentage values are established according to standard deviations of the values of the remaining pixels.

At step 313, workstation 40 or a clinician determines whether there are metal jig spheres S. If metal jig spheres S are present, the process continues to steps 315 and 317 wherein the mask is updated for erosion of the jig's metal spheres. At step 315, workstation 40 projects a 3D model of the jig, generated by workstation 40 or retrieved by workstation 40 from a network or memory, onto an imaging plane of the input image according to the orientation of the input image which is determined using the metal jig sphere. The projection establishes a location and size of the metal jig sphere. Once the locations and sizes of the metal jig spheres are determined, at step 317, metal jig spheres are added as pixel groups to the mask. Each of the pixels in the pixel groups representing the metal jig spheres are assigned a pixel value of 1 in order to provide 100% erosion of the metal jig sphere when the mask is applied to the input images.

After step 317 is performed or if at step 313 it is determined that no measurement jig sphere are present, the process proceeds to step 319. At step 319 in-painting is performed using the mask replace pixels in the input images that belong to metal objects recognized in the mask. As part of the in-painting, first, an inverse mask is generated for the mask. The inverse mask is created by inverting each of the pixel values in the mask. Essentially, each pixel in the inverse mask would be equal to: 1−(value of pixel in the original mask). For instance, if a pixel in the mask has a value of "1", the pixel at the same position on the inverse mask would be assigned a value of "0". From there, a plurality of filtered inverted masks are created by applying a Gaussian filter, of size 3×3 for example. Next, a filtered 2D input image is generated by multiplying each of the plurality of 2D input images by the corresponding inverse mask using a Gaussian filter, of size 3×3 for example. Then, a blurred image is generated by dividing the filtered 2D input image by the filtered mask. If a pixel in a filtered mask is equal to 0, a zero is assigned to a corresponding pixel location in the blurred frame of the plurality of blurred image. Finally, the 2D input images are updated by multiplying the 2D input image by an array equal to 1-(the mask) and adding the product to the product of the blurred frame multiplied by the mask. The mask may be updated by assigning a 1 to every pixel where the blurred frame is equal to 0 and assigning a 0 to every pixel where the blurred frame does not equal 0.

At step 321, workstation 40 reconstructs a 3D volume using multiple in-painted input images. The 3D volume is reconstructed using back projection, which is shown in more detail in FIG. 6. Workstation 40 receives information regarding orientations $O_1$, $O_2$, $O_3$ of input images $I_1$, $I_2$, $I_3$ after metal objects are removed and in-painting. Target T is projected through space according to orientations $O_1$, $O_2$, $O_3$ for each of images $I_1$, $I_2$, $I_3$. Intersections in the projection of the target in 3D space are determined to be 3D locations of the target in 3D space. In addition to back projecting the target, additional surrounding tissue is additionally back projected in order to develop a full 3D volume that a clinician may navigate. The back projection process as applied to fluoroscopic images in a surgical environment is further described in U.S. Patent Application Publication No. 2017/0035379, the entire contents of which is hereby incorporated herein by reference.

After performing back projection, the process may continue to either step 323 or step 325. If there is no prior image data depicting the 3D volume within Patient P, the process proceeds to step 323. At step 323, the back projected 3D volume is presented to the clinician a view on user interface 816. If there is prior image data depicting the 3D volume within Patient P, the process proceeds to step 325 where the prior image data is updated before proceeding to step 323 where the update image data describing the 3D volume is displayed.

Figure 4A:
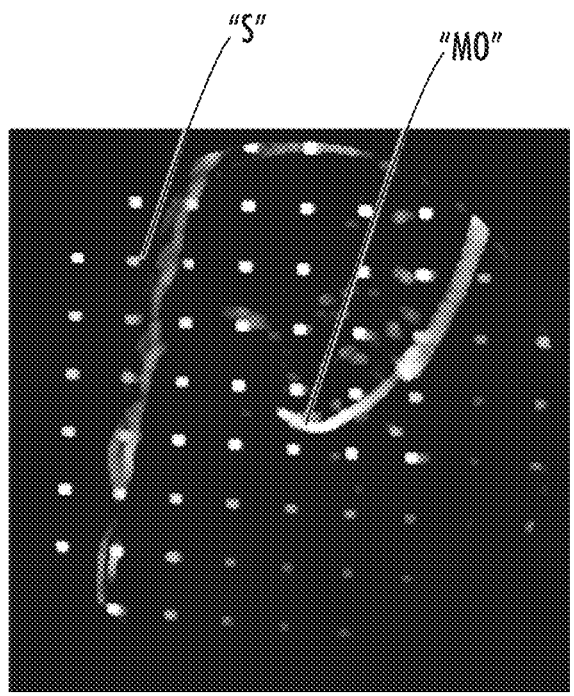
FIGS. 4A and 4B depict two masks that may be applied to remove metal objects from the example input image of FIG. 2.
Figure 4B:
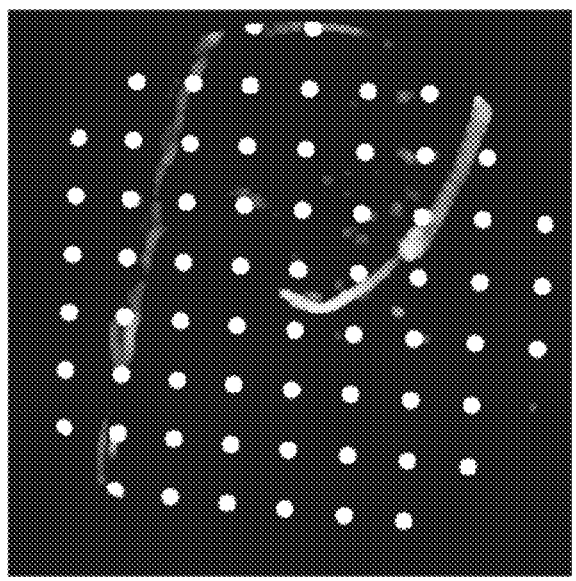

FIGS. 4A and 4B illustrate two respective masks as discussed in the process described in FIG. 3. FIG. 4A shows a mask as generated in steps 305-311 in FIG. 3. The mask in FIG. 4A includes a clear outline of metal object MO, but metal jig spheres S are represented dimly. FIG. 4B shows a mask updated to add jig projection with pixels being assigned a value of 1 in the estimated positions of the metal jig spheres S.

Figure 5:
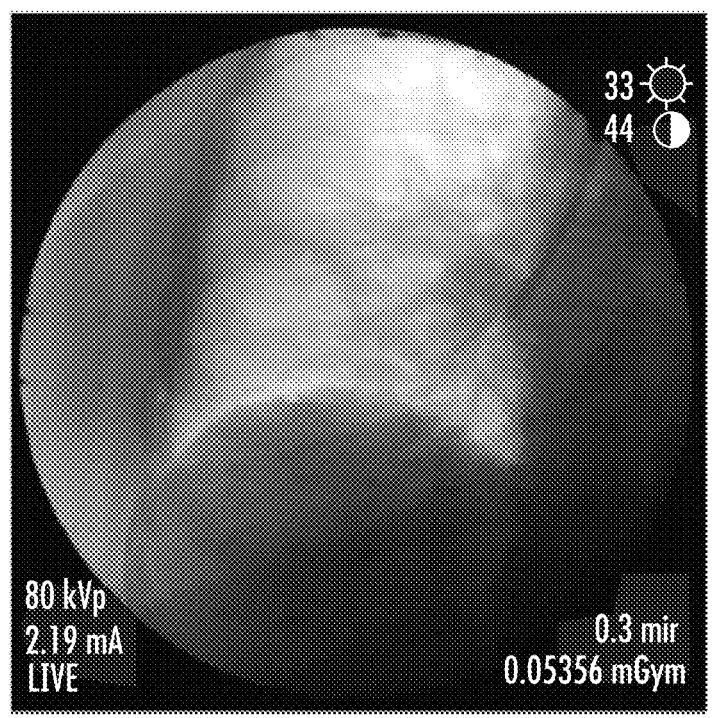
FIG. 5 depicts an image filtered using the mask of FIG. 4B to remove metal objects.

FIG. 5 illustrates a filtered image. The filtered image has been generated by applying the mask and using the in-painting technique described in FIG. 3. The filtered image shows object O and metal jig spheres S are removed and in their place, the pixel values are replaced by estimated pixel values generated in the in-painting process.

Figure 6:
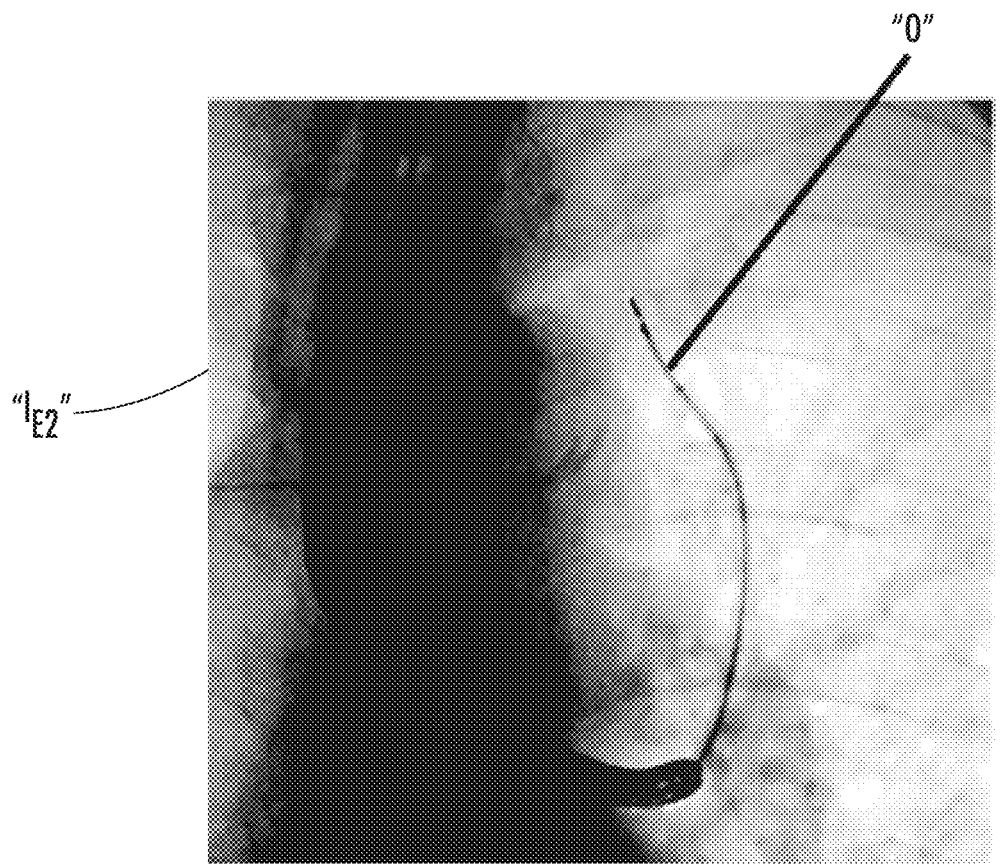
FIG. 6 depicts another example input image which may be received in the process shown in FIG. 1.

FIG. 6 illustrates example image $I_E$, an illustrative example a potential image $I_1$, $I_2$, $I_3$, of a patient P generated by fluoroscopic C-arm 10. Image $I_E$ includes metal object MO which has a known shape that can be recognized in accordance with the disclosure. Metal object MO may interfere with the generation of a 3D volume created through back projection.

Figure 7:
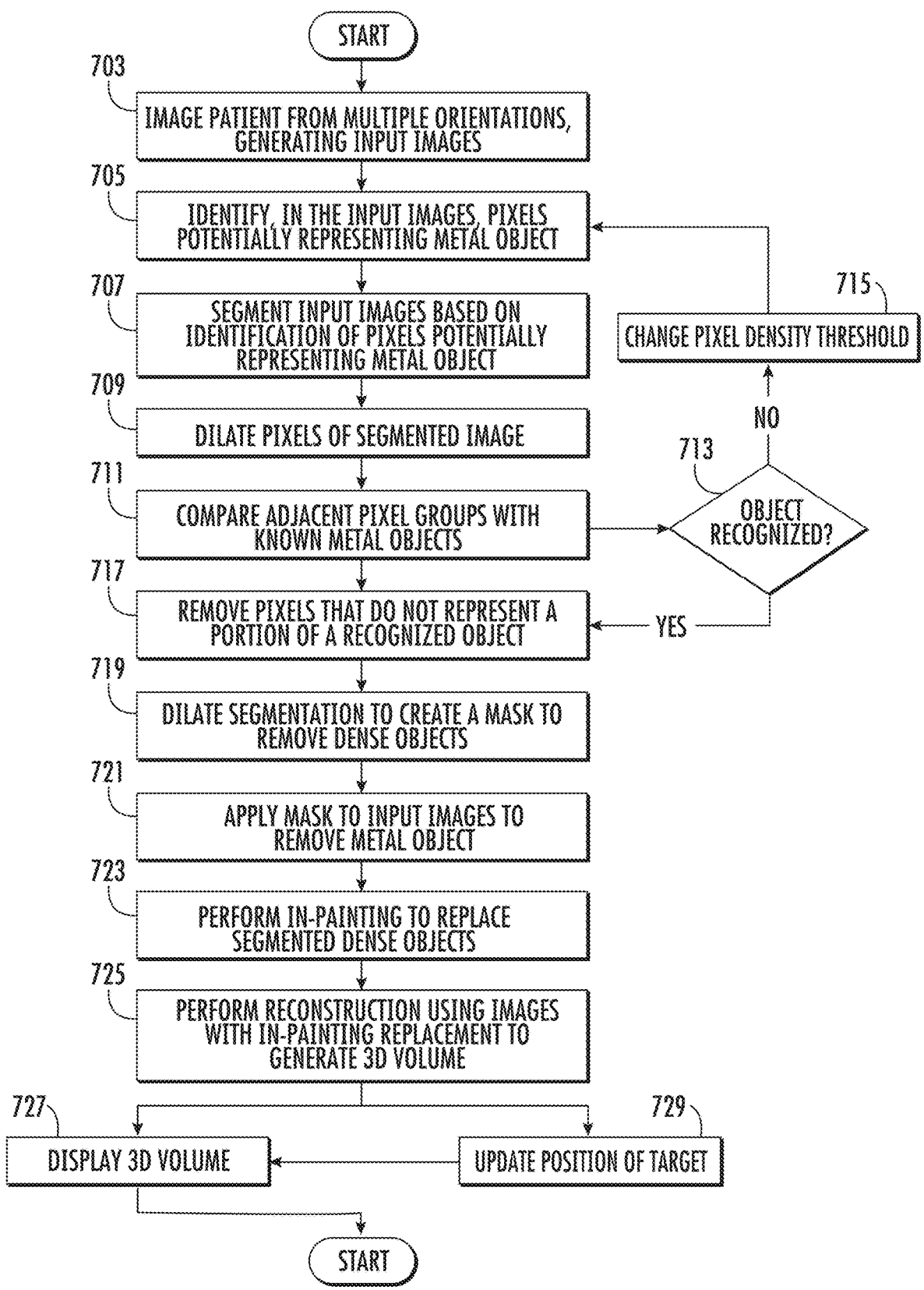
FIG. 7 depicts a flowchart describing a process for removing metal artifacts and generating an improved 3D image in accordance with the disclosure.

FIG. 7 illustrates a flowchart describing a first embodiment for removing metal artifacts to generate an improved 3D image in accordance with the disclosure. At step 303, a clinician or a motor (not shown) causes fluoroscopic C-arm 10 to move from a starting position to each of orientations $O_1$, $O_2$, $O_3$. At each orientation an image is taken by projecting x-rays from x-ray emitter 103 to x-ray receiver x-ray receiver 105. The received x-rays are used to generate pixels data for images $I_1$, $I_2$, $I_3$ according to a density of x-rays received at various locations on x-ray emitter 103. An example image $I_E$ of possible input images $I_1$, $I_2$, $I_3$ including metal object MO is shown in FIG. 6.

At step 705, pixels representing portions of objects that may be metal objects are recognized in input image $I_E$. Pixels representing portions of objects may be determined for example according to pixel intensity. Because metal objects tend to significantly deflect or absorb x-rays, these pixels will be shown in images $I_1$, $I_2$, $I_3$ as having a high pixel intensity. Accordingly, in order to recognize pixels that potentially represent a portion of metal object MO, a pixel intensity threshold is set, above which pixels are deemed to potentially represent a portion of metal object MO. These pixels may be referred to as high intensity pixels. As an example, pixels with an intensity value greater than or equal to 3000 Hounsfield Units (HU) may be considered prospective pixels representing a metal object.

At step 707, input image $I_E$ is segmented based on the determination of pixels that may potentially represent portions of metal objects. As noted above, these may be pixel with intensities greater than a certain threshold. To segment input image $I_E$, the pixels that are determined, at step 705, as potentially representing portions of metal objects are isolated and are used to generated segmented image $I_s$ (See FIG. 8). In segmented image $I_s$, the pixels potentially representing portions of metal objects are located at the same locations as in input image $I_E$ and all other pixels are excluded.

At step 709, the pixels in segmented image $I_s$ are dilated. The sizes of pixels are increased to emphasize the proximity of pixels and emphasize any patterns between adjacent pixels. The dilation of these pixels creates dilated segmented image $I_D$. Then, at step 311, workstation 40 compares groups of adjacent pixels to known metal objects. Potential known metal objects include, but are not limited to, bronchoscopes, biopsy tools, ablation devices, probes, endoscopes, a catheters, staplers, or implants. Shapes, sizes, and common orientations of the known metal object may be compared to the groups of adjacent pixels. These shapes, sizes, and common orientations may be saved in a memory in workstation 40. Alternatively, workstation 40 may receive information regarding the shape, size, and common orientation of known metal objects from a network. Additionally, a clinician may review the image and determine that a group of pixels resemble a metal device to be removed from input image $I_E$.

At step 713, workstation 40 or a clinician makes a determination of whether a metal object is recognized. In a case where the process described in FIG. 7 is being performed, there is necessarily a metal object intended to be removed. Therefore, if at step 313, no metal object is recognized, the process proceeds to step 715 before further proceeding through steps 705 through 713 until an object is recognized. At step 715, a pixel threshold is changed. As previously described, at step 705, workstation 40 identifies, in the input images, pixels potentially representing metal object. These pixels may be determined according to a pixel density threshold. If no metal object is recognized at step 313, the pixel density threshold may be lowered in order to identify additional pixels that may represent a portion of a metal object.

If, at step 713, workstation 40 or a clinician determines that one or more metal objects are recognized, then the process proceeds to step 717. At step 717, all pixels that do not represent a recognized metal object are removed from dilated segmented image $I_D$ to generate an image with pixels representing only identified metal objects $I_O$.

At step 719, the peripheral pixels belonging to the identified metal object in image $I_O$ are dilated to create metal object mask M which is design to remove metal objects from input image $I_E$. In dilating the pixels, workstation 40 expands each of the remaining pixels to ensure that the pixels cover the full area of the metal object in input image $I_E$. Segmented pixels after dilation whose HU value is below 1000 are excluded. By setting these metal pixels to one and all other pixels to zero, a binary metal image is produced. The corresponding projections of the metal in the original sinogram are identified via forward projection of this metal image. At step 721, metal object mask is applied to input image $I_E$ to remove all pixels from input image $I_E$ that correspond to the location of the dilated pixels from mask M.

At step 723, the pixels in input image $I_E$ that were removed according to mask M are replaced using in-painting. In-painting involves reconstructing missing pixel data by interpolating pixel data of the rest of the image to areas where the pixel data is removed or missing. The pixel data may be interpolated using a structural approach, a geometric approach, or a combination thereof. With structural in-painting techniques, workstation 40 interpolates the removed pixels by continuing repetitive pattern in input image $I_E$. With geometric in-painting techniques, workstation 40 interpolates the removed pixels by creating consistency of the geometric structure in input image $I_E$. For instance, contour lines that arrive at boundary of missing pixels are prolonged into the missing pixel area.

At step 725, workstation 40 reconstructs a 3D volume using multiple in-painted input images $I_E$. The 3D volume is reconstructed using back projection, which is shown in more detail in FIG. 6. Workstation 40 receives information regarding orientations $O_1$, $O_2$, $O_3$ of input images $I_1$, $I_2$, $I_3$ after metal objects are removed and in-painting. Target T is projected through space according to orientations $O_1$, $O_2$, $O_3$ for each of images $I_1$, $I_2$, $I_3$. Intersections in the projection of the target in 3D space are determined to be 3D locations of the target in 3D space. In addition to back projecting the target, additional surrounding tissue is additionally back projected in order to develop a full 3D volume that a clinician may navigate. The back projection process as applied to fluoroscopic images in a surgical environment is further described in U.S. Patent Application Publication No. 2017/0035379, the entire contents of which is hereby incorporated herein by reference.

After performing back projection, the process may continue to either step 727 or step 729. If there is no prior image data depicting the 3D volume within Patient P, the process proceeds to step 727. At step 727, the back projected 3D volume is presented to the clinician a view on user interface 816. If there is prior image data depicting the 3D volume within Patient P, the process proceeds to step 729 where the prior image data is updated before proceeding to step 727 where the update image data describing the 3D volume is displayed.

Figure 8:
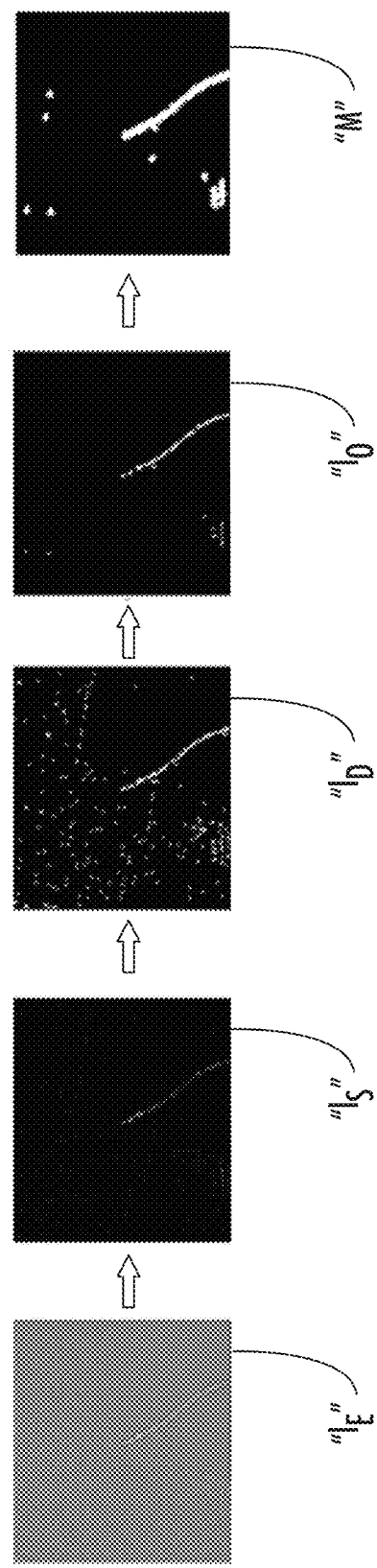
FIG. 8 depicts a diagram showing a progression of images in the generation of a mask to remove metal objects.

FIG. 8 illustrates a progression of images used to generate mask M. First, input image $I_E$ is filtered using a pixel threshold so that only high intensity pixels remain. Filtering input image $I_E$ generates segmented image $I_s$. Then, the pixels of segmented image $I_s$ are dilated to enlarge pixel groupings or patterns and generate dilated image $I_D$. Next, pixel patterns in dilated image $I_D$ are compared to known metal objects. Those pixels that are not determined to represent portions of metal objects as determined by the comparison to known metal objects are removed to generate metal object image $I_O$. Lastly, pixels in object image $I_O$ are dilated to ensure that the pixels cover the entirety of the metal objects in the image. Mask M may then be applied to remove metal objects from input image $I_E$.

Figure 9A:
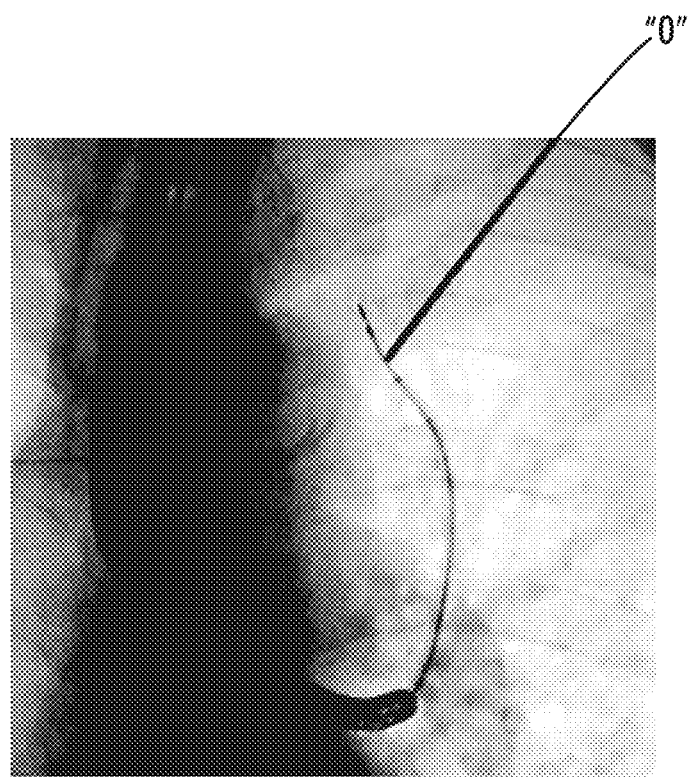
FIGS. 9A and 9B depict a 2D input image and a 2D image generated using in-painting to replace a segmented and removed metal object, respectively.
Figure 9B:
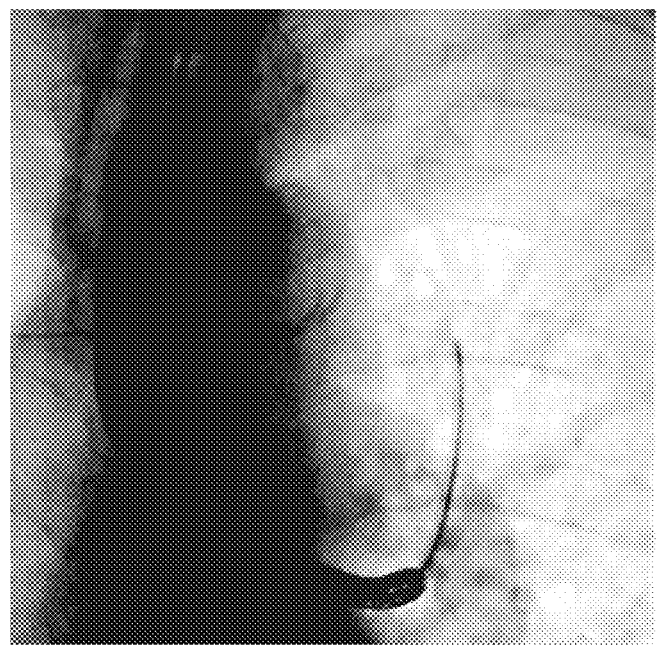

FIGS. 9A and 9B illustrate the effect of removing a metal objection and replacing it using in-painting as described in reference to FIG. 7. FIG. 9A shows 2D input image $I_E$ with metal object MO. FIG. 9B shows the same image of FIG. 9A with metal object MO removed and replaced with an estimation of what would likely be behind metal object MO.

Figure 10:
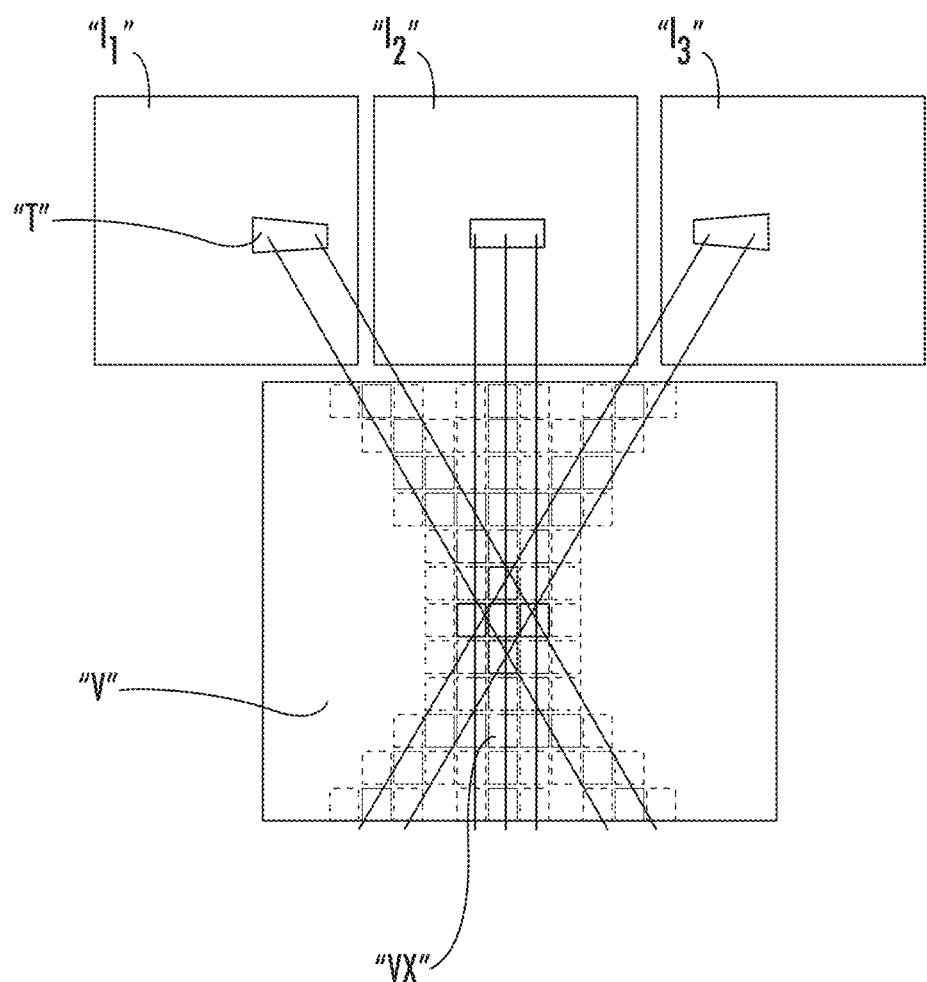
FIG. 10 depicts a diagram demonstrating the use of back projection to reconstruct a 3D volume.

With reference to FIG. 10, there is shown a diagram illustrating how back projection is performed to reconstruct 3D volume V using images $I_1$, $I_2$, $I_3$ as described in FIG. 7. Target T is projected into 3D space according to orientations $O_1$, $O_2$, $O_3$. The target location is established according to the intersection of target T where the projections of target T from images $I_1$, $I_2$, $I_3$ intersect. Target T is then generated in 3D space using 3D volume voxels Vx.

Figure 11A:
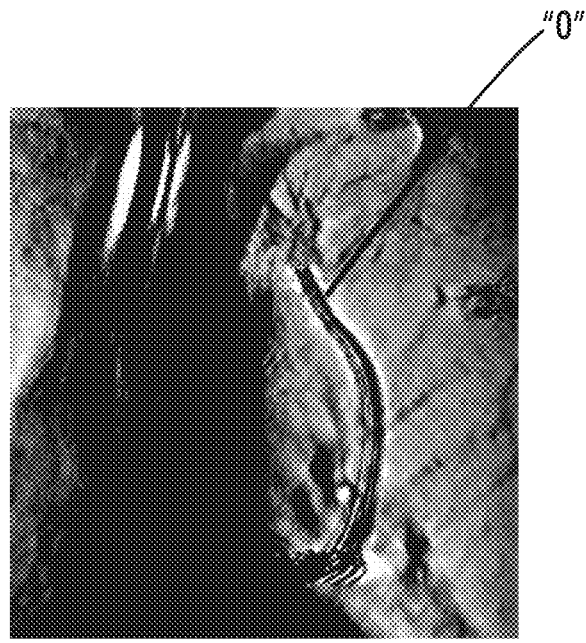
FIGS. 11A and 11B depict a 2D view of a 3D reconstructed volume and an image generated using in-painting to replace a segmented metal object, respectively.
Figure 11B:
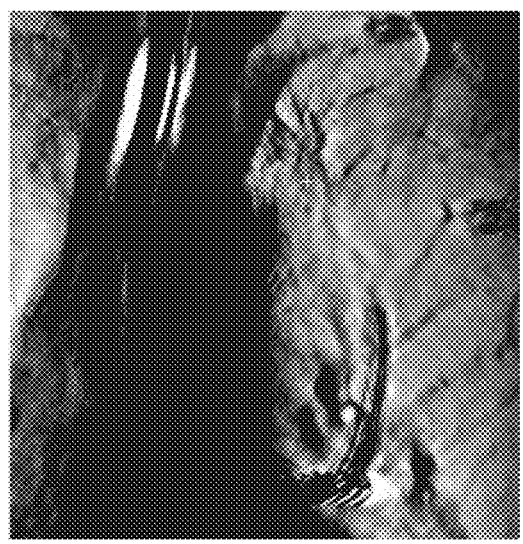
Figure 12:
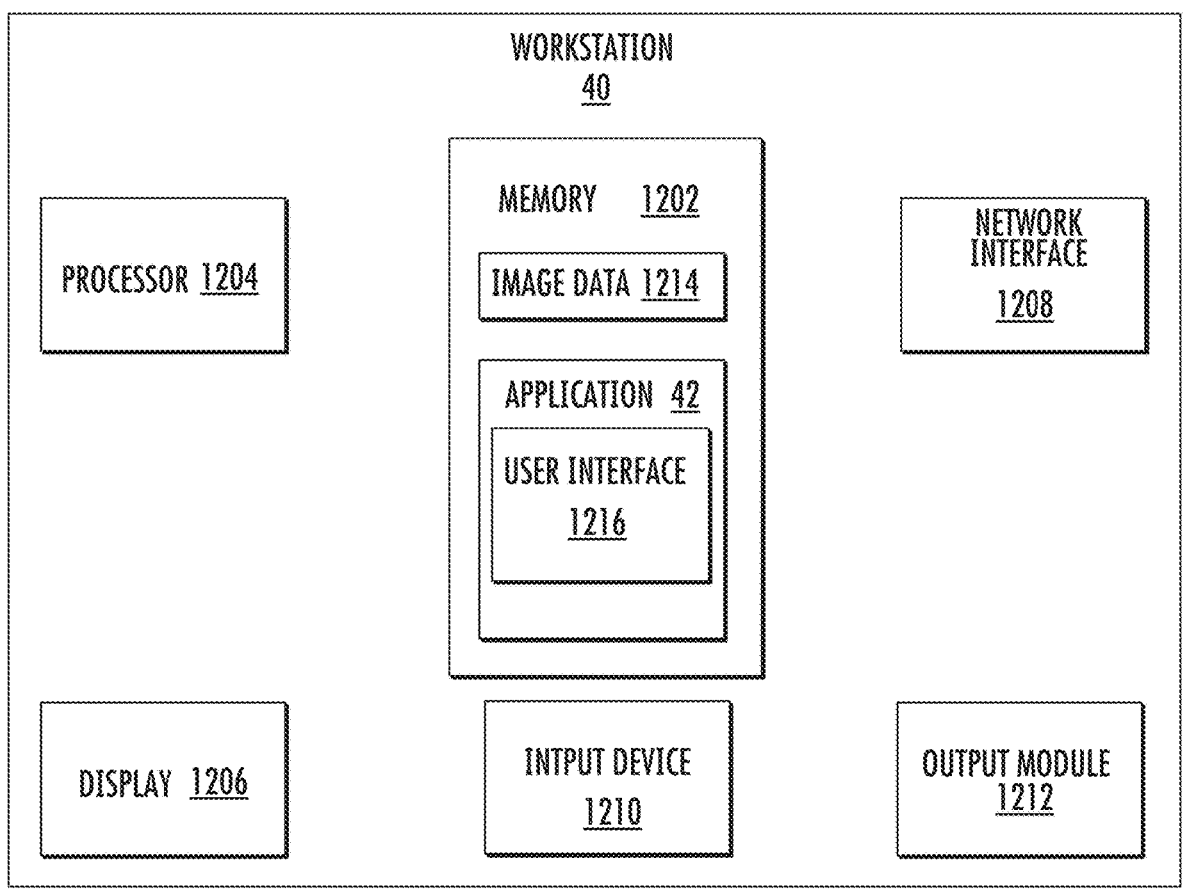
FIG. 12 is a schematic block diagram of a workstation configured for use with the system of FIG. 1.

FIGS. 11A and 11B illustrate two respective 3D volumes. FIG. 11A shows a 3D volume generated through back projection with metal object MO present. Metal object MO obstructs the view of objects beyond metal object MO, making it more difficult for a clinician to guide a medical device to treatment target T. FIG. 11B shows a 3D volume generated through back projection with using 2D images in which the metal object has been removed and replaced using in-painting. As a result, the volume shown in FIG. 11B does not include metal object MO.

FIG. 8 illustrates a system diagram of workstation 40. Workstation 40 may include memory 1202, processor 1204, display 1206, network interface 808, input device 1210, and/or output module 1212. Memory 1202 includes any non-transitory computer-readable storage media for storing data and/or software that is executable by processor 1204 and which controls the operation of workstation 40. In an embodiment, memory 1202 may include one or more solid-state storage devices such as flash memory chips. Alternatively or in addition to the one or more solid-state storage devices, memory 1202 may include one or more mass storage devices connected to the processor 1204 through a mass storage controller (not shown) and a communications bus (not shown). Although the description of computer-readable media contained herein refers to a solid-state storage, it should be appreciated by those skilled in the art that computer-readable storage media can be any available media that can be accessed by the processor 1204. That is, computer readable storage media includes non-transitory, volatile and non-volatile, removable and non-removable media implemented in any method or technology for storage of information such as computer-readable instructions, data structures, program modules or other data. For example, computer-readable storage media includes RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by workstation 40.

Memory 1202 may store application 42 and/or image data 1214. Application 42 may, when executed by processor 1204, cause display 1206 to present user interface 1216. Network interface 608 may be configured to connect to a network such as a local area network (LAN) consisting of a wired network and/or a wireless network, a wide area network (WAN), a wireless mobile network, a Bluetooth network, and/or the internet. Input device 1210 may be any device by means of which a clinician may interact with workstation 40, such as, for example, a mouse, keyboard, foot pedal, touch screen, and/or voice interface. Output module 1212 may include any connectivity port or bus, such as, for example, parallel ports, serial ports, universal serial busses (USB), or any other similar connectivity port known to those skilled in the art.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

Specifically, while embodiments of the disclosure have been described with respect to a fluoroscopic scanner, it is not intended that the disclosure be limited thereto. The current disclosure contemplates use of the systems and methods described herein to plan a path to a target that avoids obstructions that may be present during the performance of various surgical procedures. Those skilled in the art would envision numerous other obstructions.

Detailed embodiments of such devices, systems incorporating such devices, and methods using the same are described above. However, these detailed embodiments are merely examples of the disclosure, which may be embodied in various forms. Therefore, specific structural and functional details disclosed herein are not to be interpreted as limiting but merely as a basis for the claims and as a representative basis for allowing one skilled in the art to variously employ the disclosure in virtually any appropriately detailed structure.

Although embodiments have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing embodiments may be made without departing from the scope of the disclosure as set forth in the following claims.

What is claimed is:

1. A method for generating a three dimensional (3D) volume including a treatment target, comprising:
    receiving a plurality of two dimensional (2D) input images of a patient, the plurality of 2D input images including a treatment target;
    recognizing a metal artifact in each of the plurality of 2D input images;
    removing the metal artifact from the plurality of 2D input images based on the recognition of the metal artifact;
    generating alternative pixel data based on a plurality of blurred images and the plurality of 2D input images;

replacing the metal artifact with the alternative pixel data to generate a plurality of filtered 2D images; and generating the 3D volume from the plurality of filtered 2D images.

2. The method according to claim 1, wherein the plurality of 2D input images is received from a fluoroscopic imager.

3. The method according to claim 1, further comprising imaging the patient to generate the plurality of 2D input images.

4. The method according to claim 1, wherein a known metal artifact is created due to one or more of a bronchoscope, a biopsy tool, an ablation device, a probe, an endoscope, a catheter, a stapler, an implant, or components of an angle measurement jig.

5. The method according to claim 1, further comprising generating a plurality of masks that correspond to the plurality of 2D input images, wherein removing the metal artifact from the plurality of 2D input images includes applying the plurality of masks to the corresponding plurality of 2D input images.

6. The method according to claim 5, further comprising:

computing a plurality of inverse masks corresponding to the plurality of masks;

generating a plurality of filtered 2D input images by multiplying each of the plurality of 2D input images by the plurality of inverse masks, respectively, using a first Gaussian filter;

generating a plurality of filtered masks by filtering the plurality of inverse masks using a second Gaussian filter; and generating the plurality of blurred images by dividing each of the plurality of filtered 2D input images by a corresponding filtered mask of the plurality of filtered masks, wherein if a pixel in a filtered mask is equal to 0, a zero is assigned to a corresponding pixel location in a corresponding blurred frame of the plurality of blurred images.

7. The method according to claim 1, wherein generating the 3D volume from the plurality of filtered 2D images includes back projecting filtered 2D images.

8. A system for generating a three dimensional (3D) volume including a treatment target, the system comprising a processor and a memory storing an application, which, when executed by the processor, causes the processor to:

recognize a metal artifact in a plurality of two dimensional (2D) input images of a patient including a target;

generate alternative pixel data based on a plurality of inverse masks, a plurality of blurred images, and the plurality of 2D input images;

replace pixels in the plurality of 2D input images corresponding to the recognized metal artifact with alternative pixel data to generate a plurality of filtered 2D images; and generate a 3D volume based on the plurality of filtered 2D images.

9. The system according to claim 8, further comprising:

computing the plurality of inverse masks corresponding to the plurality of masks;

generating a plurality of filtered 2D input images by multiplying each of the plurality of 2D input images by the plurality of inverse masks, respectively, using a first Gaussian filter;

generating a plurality of filtered masks by filtering each of the plurality of inverse masks using a second Gaussian filter; and generating the plurality of blurred images by dividing each of the plurality of filtered 2D input images by a corresponding filtered mask of the plurality of filtered masks, wherein if a pixel in a filtered mask is equal to 0, a zero is assigned to a corresponding pixel location in a corresponding blurred frame of the plurality of blurred images.

10. The system according to claim 8, wherein the processor is caused to generate a plurality of 2D masks that correspond to the plurality of 2D input images.

11. The system according to claim 10, further comprising removing the metal artifact from the plurality of 2D input images by applying the plurality of 2D masks to the corresponding plurality of 2D input images.

12. The system according to claim 8, wherein the 3D volume is generated by back projecting the filtered 2D images.

13. A method for generating a three dimensional (3D) volume including a treatment target, comprising:

recognizing a metal artifact in a plurality of two dimensional (2D) input images, the 2D input images being of a patient including a target;

generating alternative pixel data based on a plurality of inverse masks, a plurality of blurred images, and the plurality of 2D input images;

replacing pixels in the plurality of 2D input images corresponding to the recognized metal artifact with alternative pixel data to generate a plurality of filtered 2D images;

generating a 3D volume based on the plurality of filtered 2D images; and displaying the generated 3D volume on a display.

14. The method according to claim 13, further comprising generating a plurality of 2D masks that correspond to the plurality of 2D input images.

15. The method according to claim 14, further comprising removing the metal artifact from the plurality of 2D input images by applying the plurality of 2D masks to the corresponding plurality of 2D input images.

16. The method according to claim 13, further comprising:

computing the plurality of inverse masks corresponding to the plurality of masks;

generating a plurality of filtered 2D input images by multiplying each of the plurality of 2D input images by the plurality of inverse masks, respectively, using a first Gaussian filter;

generating a plurality of filtered masks by filtering each of the plurality of inverse masks using a second Gaussian filter; and generating the plurality of blurred images by dividing each of the plurality of filtered 2D input images by a corresponding filtered mask of the plurality of filtered masks, wherein if a pixel in a filtered mask is equal to 0, a zero is assigned to a corresponding pixel location in a corresponding blurred frame of the plurality of blurred images.

17. The method according to claim 13, wherein generating the 3D volume based on the plurality of filtered 2D images includes back projecting filtered 2D images.

18. The method according to claim 13, wherein the plurality of 2D images is received from a fluoroscopic imager.

* * * * *